INVENTOR.
JULIAN D. GORDON
BY
Wolf, Greenfield + Hieken
ATTORNEYS

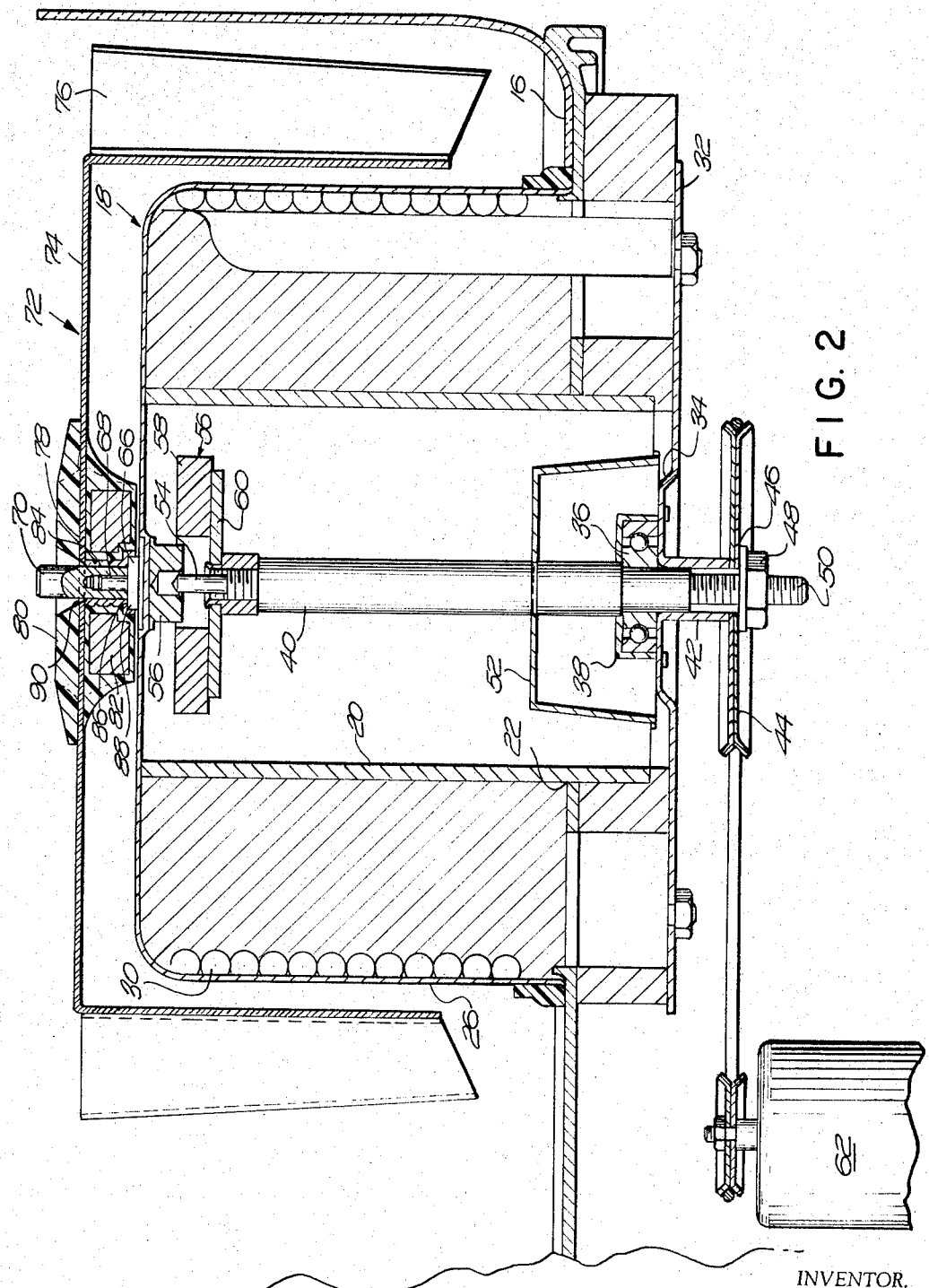

United States Patent Office 3,360,956
Patented Jan. 2, 1968

3,360,956
CIRCULATION SYSTEM FOR BEVERAGE
DISPENSERS
Julian D. Gordon, Peabody, Mass., assignor to Jet Spray
Cooler, Inc., Waltham, Mass., a corporation of Massachusetts
Continuation of application Ser. No. 512,962, Dec. 10, 1965. This application Dec. 8, 1966, Ser. No. 600,272
7 Claims. (Cl. 62—392)

This is a continuation of application Ser. No. 512,962, filed Dec. 10, 1965, now abandoned.

This invention relates to refrigerated beverage dispensers of the type used in soda fountains, restaurants, and other commercial institutions which serve food. More particularly, this invention relates to the circulation system in such beverage dispensers.

Beverage dispensers of the general class to which this invention relates, normally include a transparent bowl mounted on a stand, a refrigerating system mounted in the stand, an evaporator forming part of the system which extends into the bowl for cooling the beverage and a pump for circulating the beverage in the bowl. In the prior art devices of which the cooler shown in Patent No. 3,119,531 dated Jan. 28, 1964, is an example, an enclosed pump is provided in the bottom of the bowl, which discharges the beverage in part through a stand pipe to give a fountain effect inside the bowl, and in part through an orifice which causes the beverage to circulate in the bowl about the evaporator. That type of circulating system is not particularly suitable for dispensers carrying beverages that are relatively heavy or pulpy, such as orange juice, tomato juice, and other fruit and vegetable juices. That form of circulating system also is not suitable for use with beverages that have a tendency to foam when agitated. The discharge of the liquid through the orifice at the outlet of the pump has a definite foaming action.

One important object of this invention is to provide a circulating system suitable for use in beverage dispensers containing pulpy and heavy juices.

Another important object of this invention is to provide a circulating system for beverage dispensers, which does not cause the beverage to foam during circulation.

Yet another important object of this invention is to provide a paddle-type agitator for beverage dispensers which does not have any mechanical connections between the paddle and the driving mechanism disposed within the stand.

Still another important object of this invention is to provide a most sanitary dispenser for beverages which is free of all mechanical connections between the drive mechanism in the stand and the circulating system in the beverage bowl, such as mechanical linkages, couplings and shafts, that require special seals and create crevices that produce unsanitary conditions.

To accomplish these and other objects, the present invention includes a beverage dispenser having a stand, and a bowl with an opening in its bottom mounted on the stand. A refrigeration system is disposed in the stand and includes an evaporator dome which extends upwardly from the stand and projects into the bowl through the opening. A refrigeration coil is disposed within the dome about its inner surface. A shaft extends upwardly in the center of the dome and carries a drive magnet at its top just beneath the dome top. Means are mounted in the stand directly connected to the shaft for rotating the shaft inside the dome. A paddle is mounted on top of the dome and has arms which extend downwardly about the side walls for circulating the beverage in the bowl about the dome. A driven magnet is carried by the paddle just above the top of the dome, and the driven magnet is magnetically coupled to the drive magnet for rotating the paddle when the shaft rotates.

These and other objects and features of this invention along with its incident advantages will be better understood and appreciated from the following detailed description of one embodiment thereof, selected for purposes of illustration and shown in the accompanying drawing, in which:

FIG. 2 is an enlarged fragmentary cross-sectional view of a portion of the beverage dispenser shown in FIG. 1.

Figure 1:
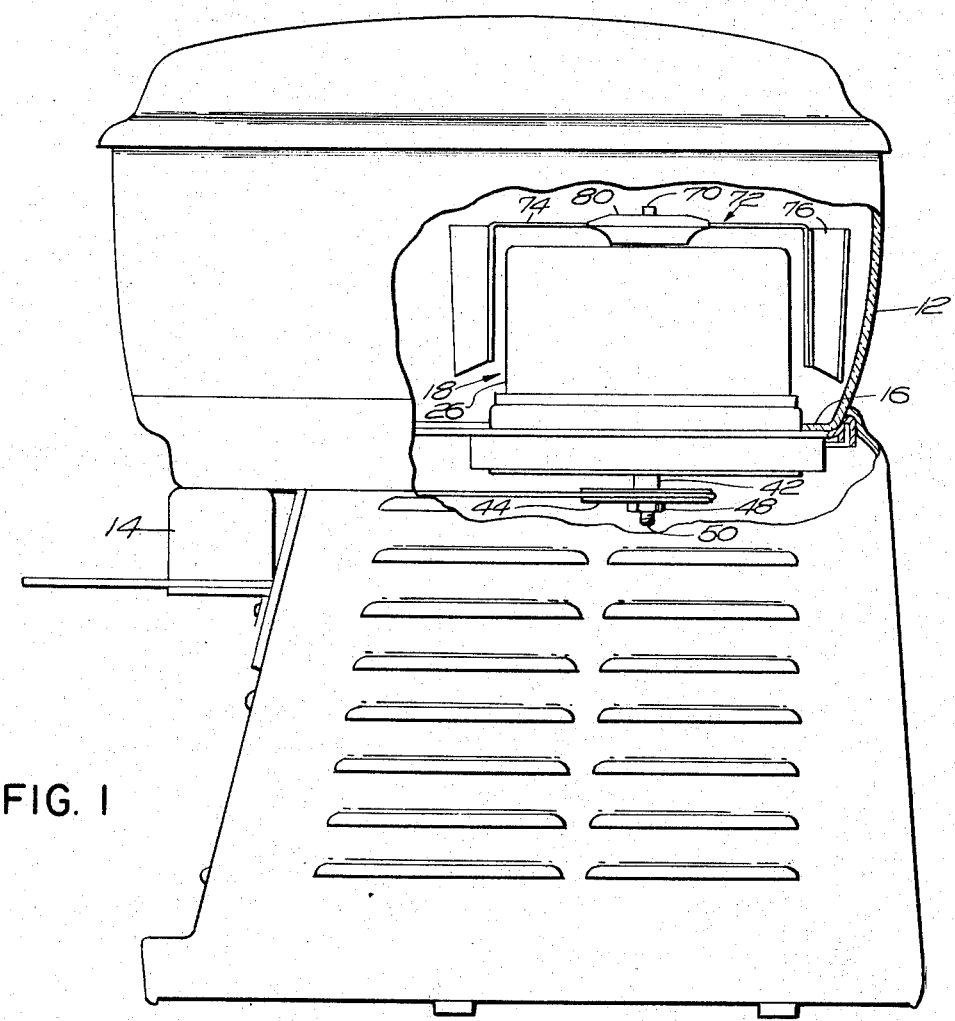
FIG. 1 is a side elevation view of a beverage dispenser, partly in section, embodying the circulator of this invention.

The embodiment of this invention shown in the drawing includes a stand 10 and a bowl 12 having a discharge spout 14 adjacent its front wall. The stand 10 carries a tray 16 on which the bowl 12 rests, and an evaporator 18 extends through the tray and into the bowl 12.

A tube lining 20 extends upwardly through opening 22 in the tray 16 and the lining forms a core for the evaporator 18. The evaporator also includes an outer dome 24 having a cylindrical side wall 26 and a flat top wall 28 which may be integrally formed as a single unit. The lower edge of the cylindrical wall 26 of the dome is seated on the tray 16, and the refrigeration coils 30 line the inside of the cylindrical wall as is evident in FIG. 2. Polyurethane foam insulation fills the space between the tube lining 20 and the coils to improve the efficiency of the evaporator.

A bearing plate 32 is carried below the supporting tray 16 which plate is provided with a raised central platform 34 that support lower bearings 36. The bearings 36 are held in place by the bearing retainer 38.

A shaft 40 extends upwardly through the center of the bearing plate 32 and is supported in the bearing 36. A spacer 42 secured to and rotatable with the shaft extends downwardly from bearings 36 and orients a pulley wheel 44 on the bottom of the shaft held in place by a washer 46 and nut 48 threaded onto the lower end 50 of the shaft. The shaft 40 carries a shroud 52 that extends over the bearings 36 and serves as a sweat shield to protect the bearings.

The upper end of the shaft 40 carries a bearing pin 54 seated in bearing 56 secured to the top wall 28 of the evaporator dome 24. The upper end of the shaft 40 also carries a magnetic drive assembly 56 that includes a circular magnet 58 carried on a plate 60. Adjacent the lower end of the shaft a motor 62 is mounted in the stand 10 and carries a pulley on its shaft and through a belt 64 about the pulleys rotates the shaft upon energization of the motor. It is evident in FIG. 2 that the speed of rotation of the shaft 40 may very easily be varied by changing the pulley 44. Different beverages may react better to different agitation, and merely by changing the pulley 44 the right speed may be achieved for the paddle. Typically the paddle may rotate at 40 r.p.m.

A very shallow recess is provided in the center of the upper wall 28 of the cold dome 24, and a stepped disc 66 is spot welded to the wall 28 and carries a stud 68. An axle 70 having an axial bore at its lower end is pressed or otherwise fitted onto the stud 68, which axle provides a support for the paddle 72. The paddle 72, made of stainless steel or some other comparable material satisfying the standards of cleanliness required for such devices, has a flat central horizontal member 74 and a pair of vertical arms 76, one at each end which are generally channel-shaped and each faces the direction in which the arms move when the paddle rotates about the axle 70. The flat horizontal arm 72 has its central portion 78 imbedded in a plastic capsule 80 within which is imbedded driven magnet 82. The driven magnet 82 is axially aligned with the drive magnet 58 when the paddle is assembled on the axle 70 so that the two magnets are magnetically coupled together. The capsule 80 is doughnut-shaped and the center hole 84 which fits on the axle 70 is lined with sleeve 85. A step 86 is provided at the bottom of the sleeve 85, which rests upon the shoulder 88 of the disc 66. The shoulder and step cooperate to position the magnet 82 immediately above the top wall 28 of the evaporator dome 18 so as to provide limited clearance between the magnet 82 and the horizontal wall. As is evident in FIG. 2, the axle 70 extends through the sleeve 85 in the plastic capsule 80 and an opening 90 in the horizontal arm 74 of the paddle. The limited clearance between the magnet 82 and the horizontal wall is not so small as to create solids in dairy beverages and is not so large as to disturb the magnetic linkage between the drive and driven magnets.

The axle 70 may be made of a semi-rigid plastic such as polypropylene. The flexibility of the material protects the bowl, paddle and axle itself from damage should an attendant inadvertently attempt to remove the bowl from the stand without first removing the paddle. The paddle obviously may be removed merely by taking the cover off the bowl and lifting the paddle with the magnet from the axle.

Figure 3:
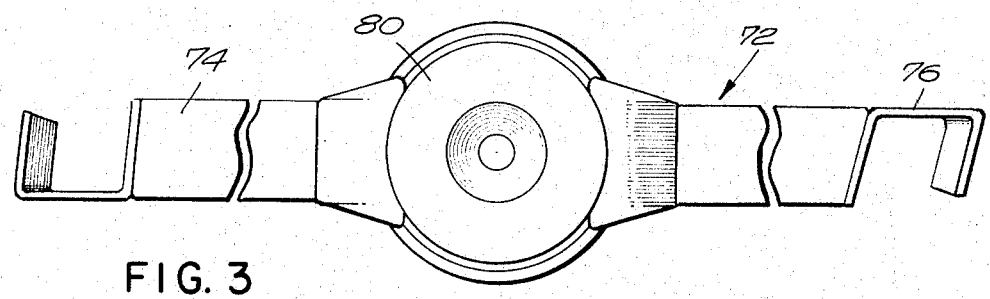
FIG. 3 is a top view of the paddle.

The vertical arms 76 shown in FIG. 3 to be channel-shaped may be spot welded or otherwise secured to the ends of the horizontal arms 74 which are bent to a vertical position. It will also be noted in the drawing that the lower edges of the arms are inclined inwardly toward the dome.

From the foregoing description it is evident that the paddle 72 may be rotated at any selected speed about the axle 70. Preferably, this rotation is held to the range of approximately 40 r.p.m. so as to set up adequate circulation without causing the beverage to foam. The very limited clearance between the inner edge of each vertical arm 76 and the cylindrical wall of the evaporator dome causes circulation immediately about the skin of the evaporator so as to prevent the creation of any dead spots about the cylindrical wall. As in other forms of circulating systems, there is no mechanical connection between the inside of the bowl and the drive mechanism. Rather, the paddle sits on the axle 70 and rotates under the action of the magnet couple between the driven magnet 82 and the drive magnet 58.

From the foregoing description those skilled in the art will appreciate that numerous modifications may be made of this invention without departing from its spirit. Therefore, it is not intended to limit the breadth of this invention to the single embodiment illustrated and described. Rather, it is intended that the scope of this invention be determined by the appended claims and their equivalents.

What is claimed is:

1. A beverage dispenser comprising
  a stand
  a bowl having an opening in its bottom and mounted on the stand,
  a refrigeration system mounted on the stand including an evaporator dome extending upwardly from the stand and projecting into the bowl through the opening, said evaporation dome having a cylindrical outer surface and being closed at its top,
  a refrigeration coil within the dome about its inner surface and packed in an insulating material,
  a shaft extending upwardly in the center of the dome and carrying a drive magnet at its top just below the top of the dome,
  means mounted in the stand for rotating the shaft,
  a paddle mounted on top of the dome and having arms that extend downwardly along the cylindrical wall for circulating beverage in the bowl about the dome, and a driven magnet carried by the paddle just above the top of the dome and magnetically coupled to the drive magnet for rotating the paddle when the shaft rotates, said paddle and shaft being free of any mechanical connection to one another.

2. A beverage dispenser as defined in claim 1 further characterized by
  said paddle being generally U-shaped and carrying the driven magnet at the center of the cross arm that joins the vertical arms that extend down along the sides of the cylindrical wall,
  and an axle made of a semi-rigid material secured to the top of the dome for supporting the paddle with its magnet concentric with the drive magnet.

3. A beverage dispenser as defined in claim 1 further characterized by
  a pulley wheel removably mounted on the bottom of the shaft,
  a motor mounted in the stand,
  and a pulley belt connected between the motor and the wheel for rotating the shaft when the motor is energized.

4. A beverage dispenser as defined in claim 1 further characterized by
  a bearing plate secured to the stand,
  bearings mounted in the plate and supporting the shaft for rotation,
  a second bearing secured to the bottom surface of the closed top of the dome for supporting the upper end of the shaft,
  and an axle secured to the top surface of the closed top of the dome aligned axially with the shaft for supporting the paddle.

5. A beverage dispenser as defined in claim 4 further characterized by
  said drive magnet being doughnut-shaped and surrounding the second bearing.

6. A beverage dispenser as defined in claim 5 further characterized by
  the driven magnet being doughnut-shaped and surrounding the axle,
  said paddle being generally U-shaped and carrying the drive magnet at the center,
  the arms of the paddle being channel-shaped and lying closely adjacent the cylindrical wall of the dome.

7. A beverage dispenser comprising
  a stand,
  a bowl having an opening in its bottom and mounted on the stand,
  a refrigeration system mounted on the stand including an evaporator dome extending upwardly from the stand and projecting into the bowl through the opening,
  a refrigeration coil within the dome,
  a shaft extending upwardly in the center of the dome and carrying a drive magnet at its top just below the top of the dome,
  means mounted in the stand for rotating the shaft,
  a paddle mounted on top of the dome and having arms for circulating beverage in the bowl about the dome,
  and a driven magnet carried by the paddle just above the top of the dome and magnetically coupled to the drive magnet for rotating the paddle when the shaft rotates,
  said paddle and shaft being free of any mechanical connection to another.

References Cited

UNITED STATES PATENTS

| 2,710,707 | 6/1955 | Persak | 62—392 X |
| 2,734,357 | 2/1956 | Fisher et al. | 62—392 |
| 2,745,641 | 5/1956 | Jacobs | 62—392 X |
| 3,255,609 | 6/1966 | Jacobs et al. | 62—392 |

LLOYD L. KING, *Primary Examiner.*